June 13, 1950  J. R. CLARK ET AL  2,511,528
NOSE GEAR DOWN LOCK

Filed Aug. 5, 1948  3 Sheets-Sheet 1

INVENTOR.
John R. Clark
Robert D. Tickett
BY

M. B. Tasker
ATTORNEY

INVENTOR.
John R. Clark
Robert D. Tickell
BY
M. B. Tasker
ATTORNEY

Patented June 13, 1950

2,511,528

UNITED STATES PATENT OFFICE 2,511,528

NOSE GEAR DOWN LOCK

John R. Clark and Robert D. Pickett, Stratford, Conn., assignors to United Aircraft Corporation, East Hartford, Conn., a corporation of Delaware Application August 5, 1948, Serial No. 42,664

6 Claims. (Cl. 244—102)

This invention relates to aircraft alighting gear and more specifically to an improved down lock for the nose gear of a tricycle type aircraft landing gear arrangement.

It is an object of this invention to provide a ground lock for the nose landing gear of an airplane equipped with a tricycle landing gear which will prevent any inadvertent retractions of a nose gear when the airplane is on the ground.

It is a further object of this invention to provide an improved down lock having a manual release that will permit the nose landing gear to be retracted when the airplane is on the ground.

It is a still further object of the invention to provide an improved down lock mechanism which includes an adjusting mechanism for insuring a positive firm fit of the lock elements.

These and other objects of this invention will become apparent from the following detailed description of the drawings wherein a preferred embodiment is illustrated.

In these drawings.

Figure 1:
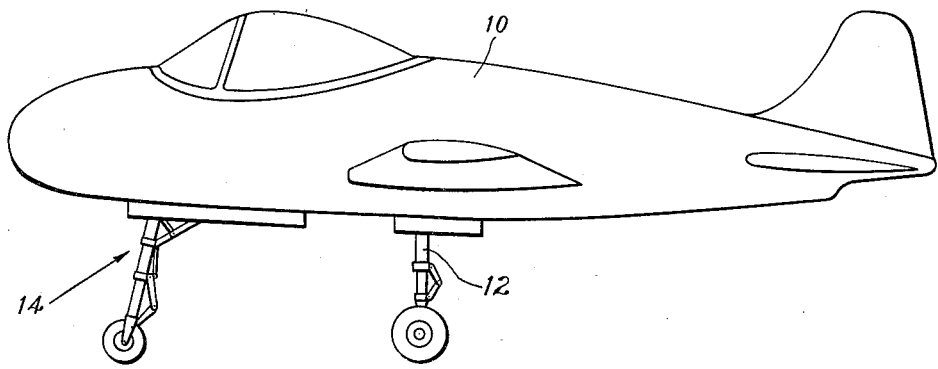
Fig. 1 shows an aircraft with a tricycle type landing gear including a nose gear embodying the down lock mechanism of this invention.

Referring to Fig. 1, an airplane indicated at 10 is supported on the ground by a main landing gear 12 and nose gear 14 which incorporates the down lock mechanism of this invention. The landing gear is adapted to be retracted into the aircraft structure in a manner well known in the art.

Figure 2:
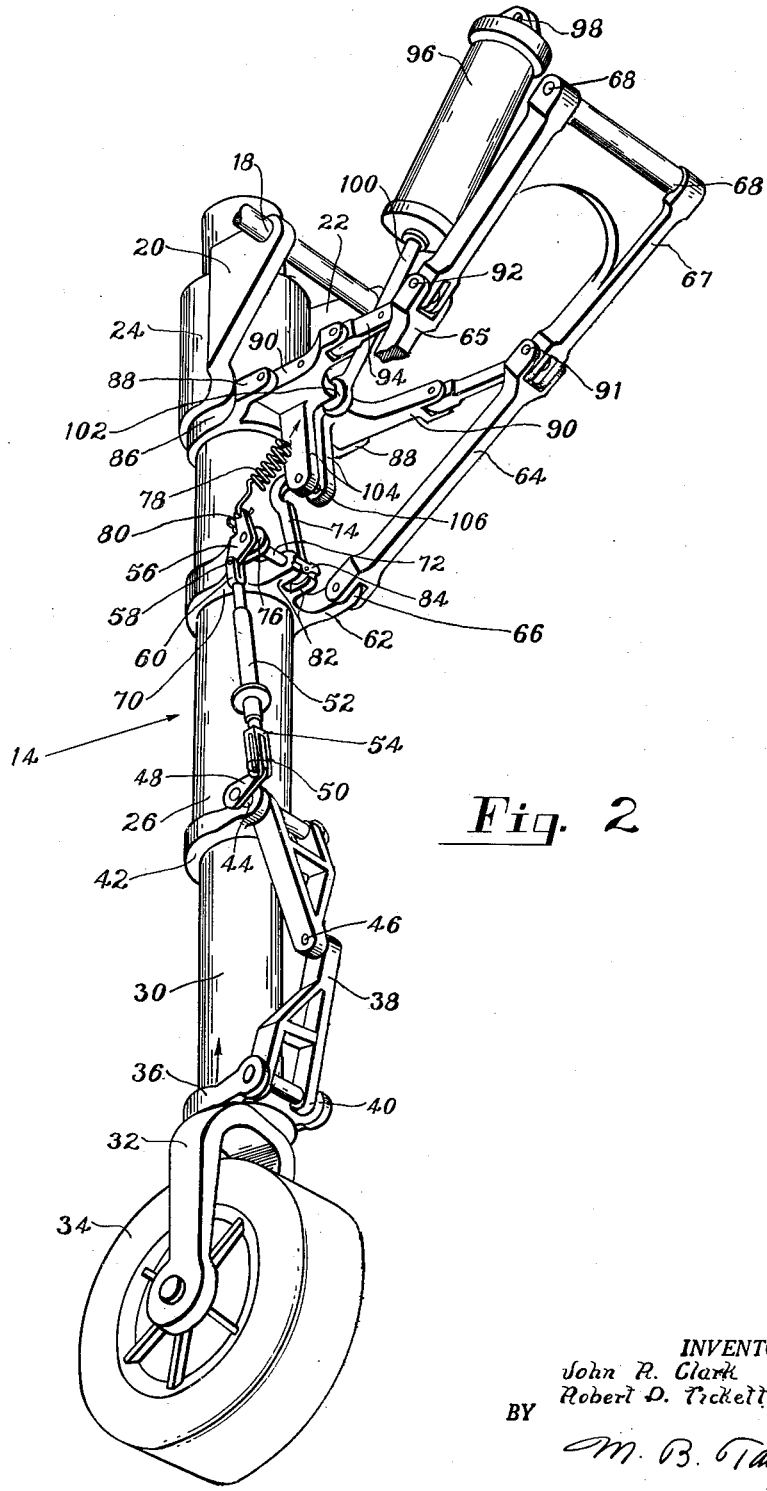
Fig. 2 is an isometric view of a nose landing gear incorporating the down locking mechanism of this invention.
Figure 3:
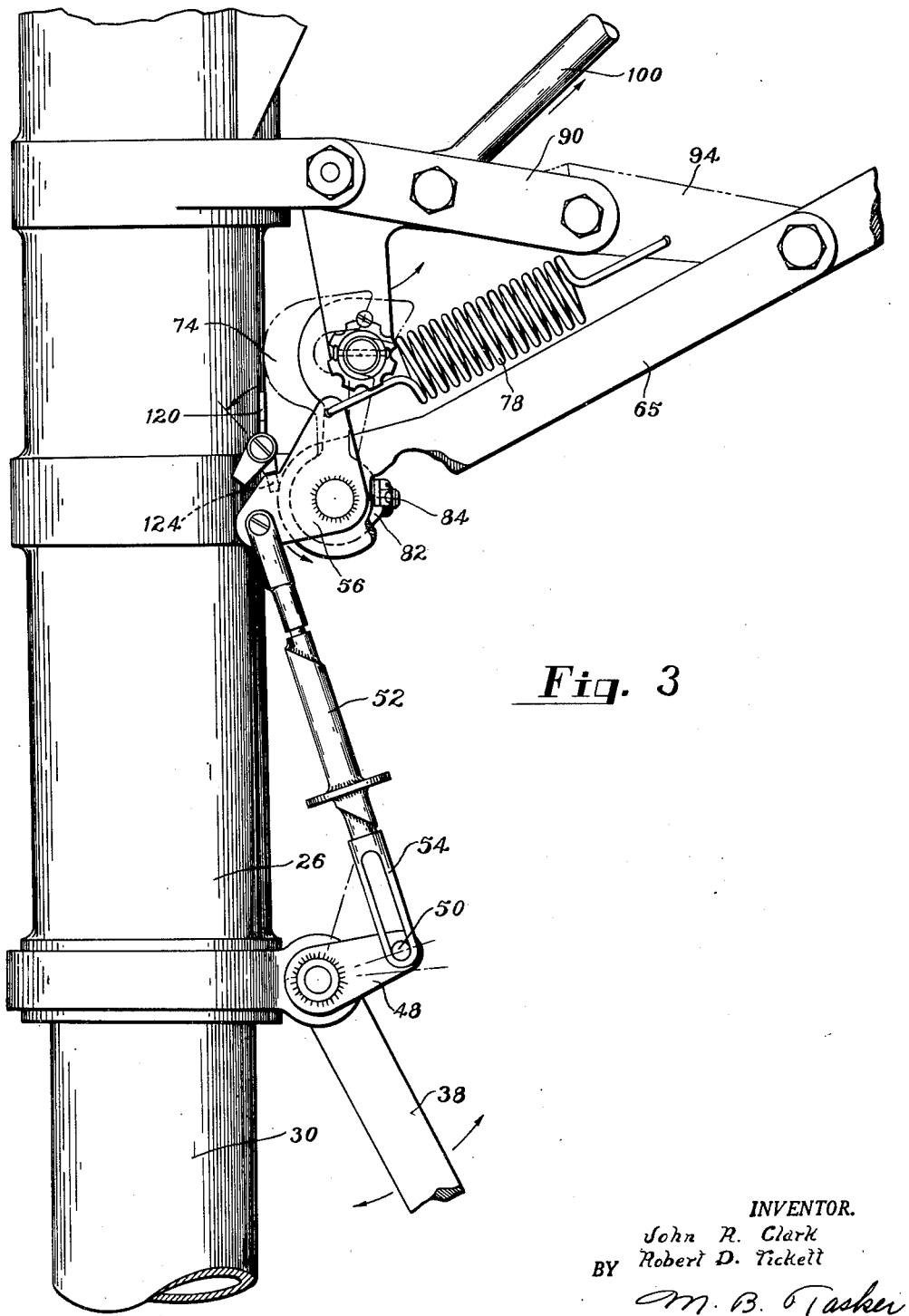
Fig. 3 is a detail side elevation of the down lock mechanism indicating the connections with the locking links of the landing gear.

Referring now to Fig. 2, the nose landing gear indicated generally at 14 is pivoted on its upper end on bar 18 which is firmly secured to aircraft structure and forms the support for the flanges 20 and 22 which are integral with the boss 24. The usual oleo shock strut 26 is firmly secured to the boss 24 and carries an extensible member 30 which telescopes therein in the usual manner. The lower end of the member 30 carries a yoke 32 which can swivel thereon and to which is secured a tire and wheel assembly 34. A clamp 36 fastened to the bottom of telescoping member 30 forms the lower connection of a scissors 38 at point 40. The scissors 38 have their upper end pivoted to the lower end of the shock strut 26 by clamp 42 which carries a connecting rod 44 thereon while the scissors elements are also pivotally connected together at 46. The rod 44 has welded thereto an arm 48 which at its free end carries a pin 50; the pin 50 being slidably connected to the upstanding rod 52 by engaging the slotted connection 54 which depends from the rod 52. The upper end of rod 52 is pivotally secured to a bell crank 56 at 58 by the usual forked connection 60. An integral collar 62 on the middle section of strut 26 provides the support for one end of the right-hand support toggle link 64 and the identical left-hand support toggle link 65, the lower end of the toggle 64 being pivoted at 66 while the lower end of toggle 65 is connected to the flange 76 and rod 72 adjacent the bell crank 56 in a manner to be described in connection with Fig. 4. The upper ends of the toggles 64 and 65 are pivotally connected to legs of a member 67 which is pivoted to aircraft structure at points 68.

A rearwardly disposed U flange 70 on the collar 62 forms a bearing support for a shaft 72 which passes through the extending portions of flange 70 and is fixed to the hook 74. The pin 72 extends through another flange 76 of collar 62 in a manner which permits bell crank 56 to be firmly attached thereto on the outboard side of flange 76. A spring 78 is fastened to the free end of bell crank 56 at 80 and tends to bias the bell crank 56 in a clockwise direction thereby tending to rotate shaft 72 and its integral hook 74 into a position to immediately engage a latch element 106 when the gear is in the extended position. The other end of spring 78 is fastened to suitable aircraft structure. The parallel flanges 70 each carry a lip 82 on their aft arcuate surfaces which, as seen better in Fig. 2, engages a cross piece 84 bolted to the hub of the hook 74 for purposes of limiting the rotational movement of the hook. The configuration and position of the cross piece 84 is more clearly shown in Fig. 4.

Another collar 86 is secured to the upper portion of the oleo strut 26 adjacent the boss 24 and carries a pair of flanges 88 extending aft therefrom which form the support for a pair of locking toggle links 90. The relatively free ends of the links 90 are attached by means of a pair of toggles 94 to the support toggle links 64 and 65 and to the ends of member 67 at 91 and 92, respectively.

For purposes of moving the gear between an extended and retracted position an actuating strut 96 is provided which is pivotally secured at 98 to aircraft structure while its piston rod 100 is secured to the locking links 90 at 102 spaced from the axis of pivotation of the links 90. Thus it can be seen that as the piston rod 100 retracts, the locking links 90 will rotate in a counterclockwise direction thereby breaking connection between toggle links 90 and 94 from an in-line position. As this locking link arrangement is broken the supporting toggle 64 is also caused to rotate in a counterclockwise direction thereby moving the toggles 64 and the pivotable member 67 from an in-line to a broken position. Further actuation of the strut 96 will then tend to rotate the entire landing gear about the bar 18 toward a retracted position.

Figure 4:
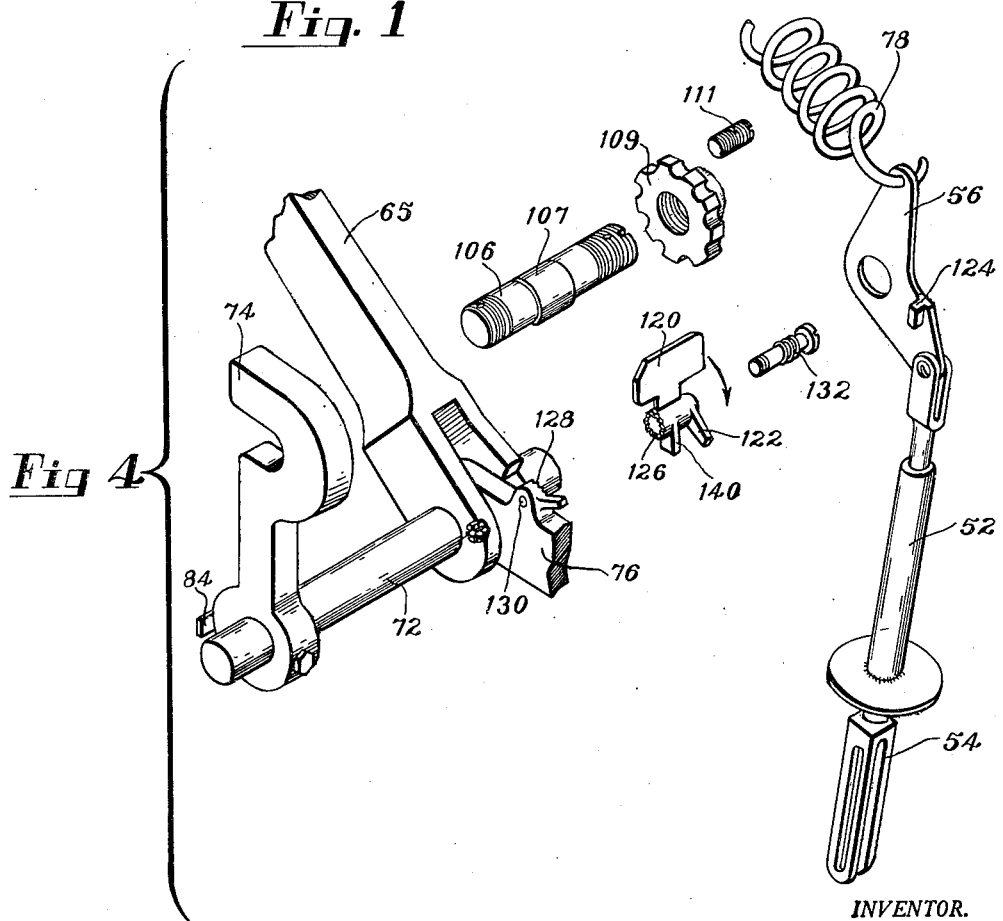
Fig. 4 is an exploded view of the locking mechanism.

The locking links 90 carry depending parallel flanges 104 which have their free ends firmly connected by the aforementioned latch element 106 which is normally engaged by the hook 74. As best seen in Fig. 4, the latch element 106 is threaded at both ends and has an eccentric cam surface 107 which can be rotatably adjusted in order to obtain a tight contact between the hook 74 and the cam surface 107. When this adjustment is made the toothed wheel 109, which is threaded and pinned onto one end of the latch element 106, is locked in place by screw 111 which is threaded into one of the depending flanges 104. When the landing gear is in the extended position the latch element 106 is in a position to receive the internal arcuate portion of the hook 74 so that when the latter is rotated over the cam surface 107 the landing gear will be positively locked down.

In operation then when the aircraft is on the ground and resting on the landing gear, the oleo strut is partially compressed thereby decreasing the angle between the elements of scissors 38. Since the arm 48 (Fig. 2) is attached to rod 44, which is also rigidly attached to the upper element of the scissors 38, any motion of the scissors will impart motion to the arm 48 and its integral pin 50, the latter being permitted to slide in the slotted connection 54. Inasmuch as the spring 78 causes the bell crank 56 to be biased in a clockwise direction the hook 74 will accordingly engage the bar 106 and this engagement will be maintained at all times when the aircraft is on the ground and the oleo strut is at least partially compressed. Therefore, while the airplane is in this position the locking effect of link 90 and link 94 will remain effective to prevent the toggle connections between 90 and 102 and between 64, 65 and the member 67 from being moved from an in-line to a broken position.

After the aircraft becomes airborne the oleo strut extends to its fully extended position due to relieving the weight of the aircraft therefrom and due to the weight of the tire and wheel 34 acting downwardly thereon. During extension of the oleo strut the angle between the elements of scissors 38 becomes greater thereby imparting clockwise rotational movement to the rod 44 and its integral arm 48 to cause the pin 50 to ride to the lower end of slot of the connector 54. Further downward movement of the pin 50 will impart similar movement to the connector 54 and the rod 52 thereby rotating bell crank 56 counterclockwise against the tension of the spring 78. Since the bell crank 56 and the hook 74 are fixed to shaft 72 the hook will also be rotated counterclockwise out of engagement with the latch element 106. Of course, when the arcuate portion of the hook 74 is free of the latch element 106 the locking link 90 is free to move when the piston rod 100 of the strut 96 commences to retract.

In modern jet or similar aircraft it is often desirable to direct the jet exhaust at an upward angle from the horizontal hence it is the practice to mount a small caster wheel on the fuselage adjacent the nose and to retract the nose gear so that the aircraft assumes a nose down or "kneeling" position. Also, this same procedure has been adopted at times where a group of aircraft are parked at close quarters within a confined area. Further, since nose gears at times have oleo struts which extend and contract through large ranges it is not always desirable from a safety standpoint to jack up the airplane extremely high during routine maintenance retraction tests in order to fully extend the strut to a gear unlock position. Therefore it is necessary that some manually operated mechanism be available to disable the nose gear down lock when the weight of the airplane is on the gear or when the oleo strut is not fully extended.

To this end the rod 52 may be manually pulled in a downward direction by ground personnel. As rod 52 is pulled downwardly the slot in connection 54 will slide freely over pin 50 and the bell crank 56, the shaft 72 and the hook 74 will be caused to rotate against the bias of spring 78 to disengage the hook from the latch element 106 in the same manner as if the oleo strut were extended. After rod 52 is pulled downwardly sufficiently the lever 120 (Fig. 4) which is pivoted on flange 76 of collar 62 can be rotated to bring the leg 122 into a position to contact the lug 124 of bell crank 56 thus preventing the bell crank 56 from rotating back in response to the bias of spring 78. The lever 120 is serrated on its inner bearing surface 126 for cooperating with corresponding serrations 128 on the pivot bearing 130 on flange 76. A spring 132 biases the lever 120 against the serrations 128 thereby preventing the lever 53 from slipping. A stop 140 is also provided on the lever 120 so that its lock position can be pivotally identified during rotational movements.

Since the particular unlocking action of the landing gear locking linkage and supporting linkage is dependent upon the initial movements of the actuating strut, the landing gear will not be retracted until such time as the piston rod 100 begins to retract sufficiently into the actuating strut 96 so that the inline position of the various toggle links may be broken. This is an additional safety factor in that as the actuating sturt 96 is ordinarily operated by hydraulic fluid and in the event of failure of the hydraulic system the locking effect of the links 90 and 94 will still be maintained.

As a result of this invention an improved aircraft nose gear retracting mechanism has been provided which not only prevents inadvertent retraction of the gear when the airplane is on the ground but also provides a means for manually disabling the gear down lock in the event that it is desired to retract the gear with the weight of the airplane thereon. Further with this manual disabling mechanism it is not necessary to jack up the airplane to such a height so as to fully extend the oleo strut when it is desired to test the landing gear through a cycle of operation.

Further as a result of this invention a positive acting mechanism has been provided which is simple in operation and construction and requires a minimum of maintenance.

Although only one embodiment of this invention has been described and illustrated in the drawings, it will be obvious that various changes and modifications can be made in the structure and arrangement of the parts without departing from the scope of this novel concept.

What it is desired to secure by Letters Patent is:

1. In a landing gear for aircraft including an oleo strut pivoted at its upper end to structure of the aircraft and carrying at its lower end a ground engaging member, retracting mechanism comprising a locking toggle, an actuating strut connected to said toggle, a support toggle pivotally connected to said oleo strut and to fixed structure of the aircraft, an operative connection between said locking toggle and said support toggle for locking the latter in a gear extended position, latch mechanism operatively connected to said ground engaging member for maintaining said locking toggle in the locked position in response to engagement of said member, and manual means for disabling the said latch mechanism when said member is engaged to permit retraction of said gear.

2. In a retractable landing gear for an aircraft having a telescoping oleo strut pivotally connected at one end to aircraft structure and at its other end carrying a ground engaging member, an actuating strut for extending and retracting said gear, a support toggle pivotally connected at its upper end to aircraft structure and at its lower end to said strut intermediate the ends of the latter, a locking toggle pivotally supported at the upper end of said oleo strut and having a connection to said support toggle, a latch member fixed to said locking toggle, a latch engaging member pivotally supported on said oleo strut and operative in response to the telescoping movements of said strut, said latch engaging member normally maintaining said locking toggle in the gear extended position while said ground engaging member is engaged, and manual means for disengaging said latch engaging member to permit said toggles and said gear to be moved to the gear retracted position while said ground engaging member is engaged.

3. In a landing gear mechanism for aircraft comprising an extensible oleo strut having a support pivotally connected to the airplane, actuating mechanism for extending and retracting said gear including a support toggle and a locking toggle operatively connected to said gear and said actuating mechanism, cooperative detent means carried by said locking toggle and said oleo strut for engageably locking said locking toggle in response to contraction of said oleo strut, manual means for actuating said detent means to unlock said locking toggle while said oleo strut is contracted, and a latch for maintaining said manual means in the unlocked position of said detent means while said oleo strut is contracted.

4. In a landing gear mechanism according to claim 3 wherein the detent means includes a resilient member having an operative connection to said locking toggle and said oleo strut for biasing said detent means into the engaged position.

5. In an aircraft landing gear mechanism having a telescoping shock absorbing unit pivotally supported at its upper end to structure of the aircraft and carrying at its lower end a ground engaging member, a power actuating strut for extending and retracting said landing gear, a support toggle having one end pivotally connected to structure of the aircraft and its other end to said unit, a locking toggle pivotally connected to said support toggle and said unit for normally locking said support toggle in the gear extended position, a latch fixed to said locking toggle, a latch engaging member supported on said unit and operatively connected to said ground engaging member, said latch engaging member adapted to maintain said locking toggle in the gear extended position upon engagement of said ground engaging member, means for releasing said latch engaging member to permit retraction of said gear in response to disengagement of said ground engaging member, manual means for disengaging said latch engaging member to permit retraction of said gear when said ground engaging member is engaged, and detent means for locking said manual means in the disengaged position of said latch engaging member.

6. In a landing gear mechanism for an aircraft comprising an oleo strut carrying a ground engaging member at its lower end and having its upper end pivotally supported to structure of the aircraft, actuating mechanism for moving said gear between extended and retracted positions, a support toggle pivoted at one end to aircraft structure and at its other end to said strut, a locking toggle pivotally interconnecting said support toggle intermediate its ends to said strut, said locking toggle having an operative connection to said actuating mechanism and operative to unlock said support toggle in response to initial movements of said actuating mechanism toward a gear retracted position, a latch member carried by said locking toggle, a latch engaging member carried by said strut and operatively connected to said ground engaging member for maintaining said locking toggle in the locking position in response to engagement of said ground engaging member, said latch member including an adjustable cam for insuring a tight engagement with said latch engaging member, manually operated means for disengaging said latch engaging member when said ground engaging member is engaged, and a locking element carried by said strut for locking said manually operated means in the disengaged position of said latch engaging member.

JOHN R. CLARK.
ROBERT D. PICKETT.

REFERENCES CITED

The following references are of record in the file of this patent:

UNITED STATES PATENTS

| Number | Name | Date |
|---|---|---|
| 2,292,671 | Sumner | Aug. 11, 1942 |
| 2,365,424 | Mercier | Dec. 19, 1944 |
| 2,427,885 | Turansky | Sept. 23, 1947 |